United States Patent [19]
Kimura et al.

[11] Patent Number: 5,637,792
[45] Date of Patent: Jun. 10, 1997

[54] EXHAUST GAS SAMPLER

[75] Inventors: Sakayuji Kimura; Hiroshi Nakai, both of Hamamatsu, Japan

[73] Assignee: Sanshin Kogyo Kabushiki Kaisha, Hamamatsu, Japan

[21] Appl. No.: 567,192

[22] Filed: Dec. 5, 1995

[30] Foreign Application Priority Data

Dec. 8, 1994 [JP] Japan .................................. 6-305006

[51] Int. Cl.⁶ .................................................. G01M 15/00
[52] U.S. Cl. ........................................... 73/116; 73/23.31
[58] Field of Search ............................. 73/23.31, 23.32, 73/115, 863.81, 863.85

[56] References Cited

U.S. PATENT DOCUMENTS

| | | | |
|---|---|---|---|
| 4,561,402 | 12/1985 | Nakano et al. | 73/23.32 |
| 5,199,297 | 4/1993 | Lin et al. | 73/863.85 |
| 5,249,453 | 10/1993 | Usami et al. | 73/23.32 |
| 5,296,197 | 3/1994 | Newbetg et al. | 73/863.85 |
| 5,442,969 | 8/1995 | Troutner et al. | 73/863.85 |
| 5,445,548 | 8/1995 | Koishikawa et al. | 73/23.31 |
| 5,535,614 | 7/1996 | Okamoto et al. | 73/23.31 |

*Primary Examiner*—John T. Kwon
*Attorney, Agent, or Firm*—Knobbe, Martens, Olson & Bear, LLP

[57] ABSTRACT

A number of embodiments of exhaust gas sampling arrangements for outboard motors wherein a sampling port is positioned in a portion of the engine in proximity to the exhaust port and in an area where it will not pass through the cooling jacket of the engine so that the exhaust gas sample will be representative of actual engine running conditions.

13 Claims, 5 Drawing Sheets

5,637,792

EXHAUST GAS SAMPLER

BACKGROUND OF THE INVENTION

This invention relates to an exhaust gas sampler for an internal combustion engine and particularly a marine outboard propulsion engine.

In many instances, it is desirable to sample the exhaust gases from one or more cylinders of an internal combustion engine. This sampling may be done continuously during engine running for control purposes or may be done periodically to determine the condition of the engine.

The way this sample is normally taken is that there is a port in a portion of the exhaust system through which a sampling tube may be extended so as to collect the combustion products upon discharge from the cylinder. Although this concept is quite effective, in some specific applications there can be specific problems.

For example, with marine propulsion engines it is the normal practice to cool the engine by circulating water through the cooling jacket from the body of water in which the watercraft is operating. The water is then returned back to the body of water in which the watercraft is operating. Normally, this is done by discharging the cooling water from the engine into the exhaust system. In this way, the cooling water can be conveniently disposed of. In addition, the addition of the cooling water to the exhaust system provides added silencing and cooling effects.

However, where this is done it has been previously the practice to have the sampling pickup location located in such an area that it could collect water along with the exhaust gases. In addition, the sampling tube may frequently pass through the engine cooling jacket and, hence, the exhaust gases will be cooled and some exhaust gas constituents may condense out from the exhaust gases. Either of these results will result in incorrect sample or reading of the exhaust gases.

It is, therefore, a principal object of this invention to provide an improved exhaust gas sampling device for a marine propulsion engine.

It is further object of this invention to provide an exhaust gas sampling arrangement for a marine propulsion engine wherein the exhaust gas samples are collected at a point well upstream of where the cooling water is introduced into the exhaust system.

It is a still further object of this invention to provide an improved exhaust gas sampling arrangement for a marine propulsion engine wherein the sampling tube does not extend through any cooling jacket of the engine so that the exhaust gases sampled will not be cooled.

SUMMARY OF THE INVENTION

This invention is adapted to be embodied in a marine propulsion engine having a cooling jacket through which water from the body of water in which the watercraft is operated is circulated for engine cooling. The engine has at least one combustion chamber with an exhaust passage that discharges the exhaust gases from the combustion chamber to the atmosphere. The coolant from the engine is returned to the body of water in which the watercraft is operating along with the exhaust gases for cooling and silencing of the exhaust gases. A sampling port is positioned in the engine body which communicates with the exhaust system at a location upstream of the point where water is introduced and at a point where the sampling tube will not pass through the engine cooling jacket.

DETAILED DESCRIPTION OF THE PREFERRED EMBODIMENTS

Figure 1:
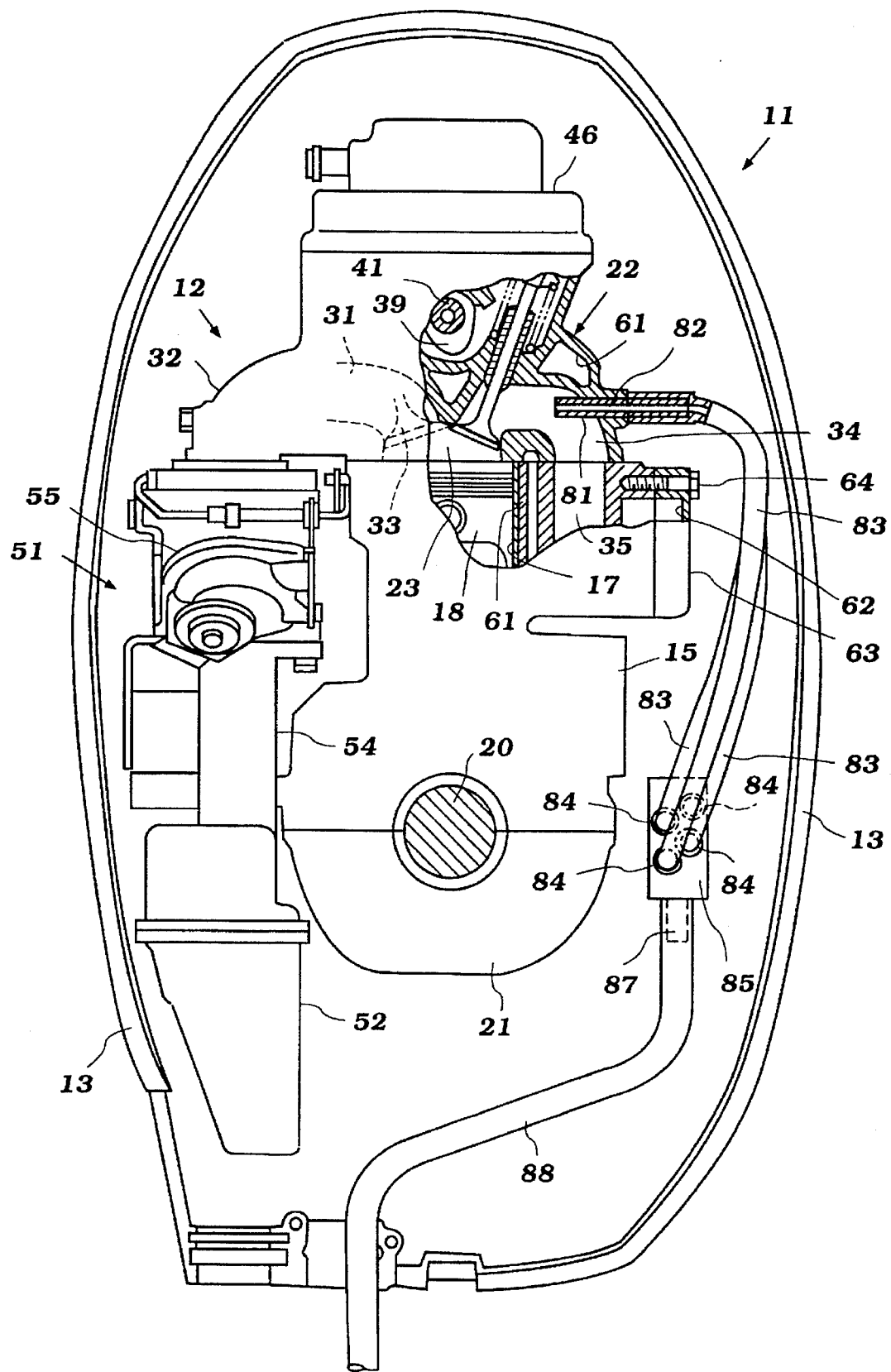
FIG. 1 is a top plan view of an outboard motor constructed in accordance with an embodiment of the invention with portions of the engine block and cylinder head external surfaces removed to illustrate in a cross-sectional view the relationship between various components of the engine and with the protective cowling partially removed.
Figure 2:
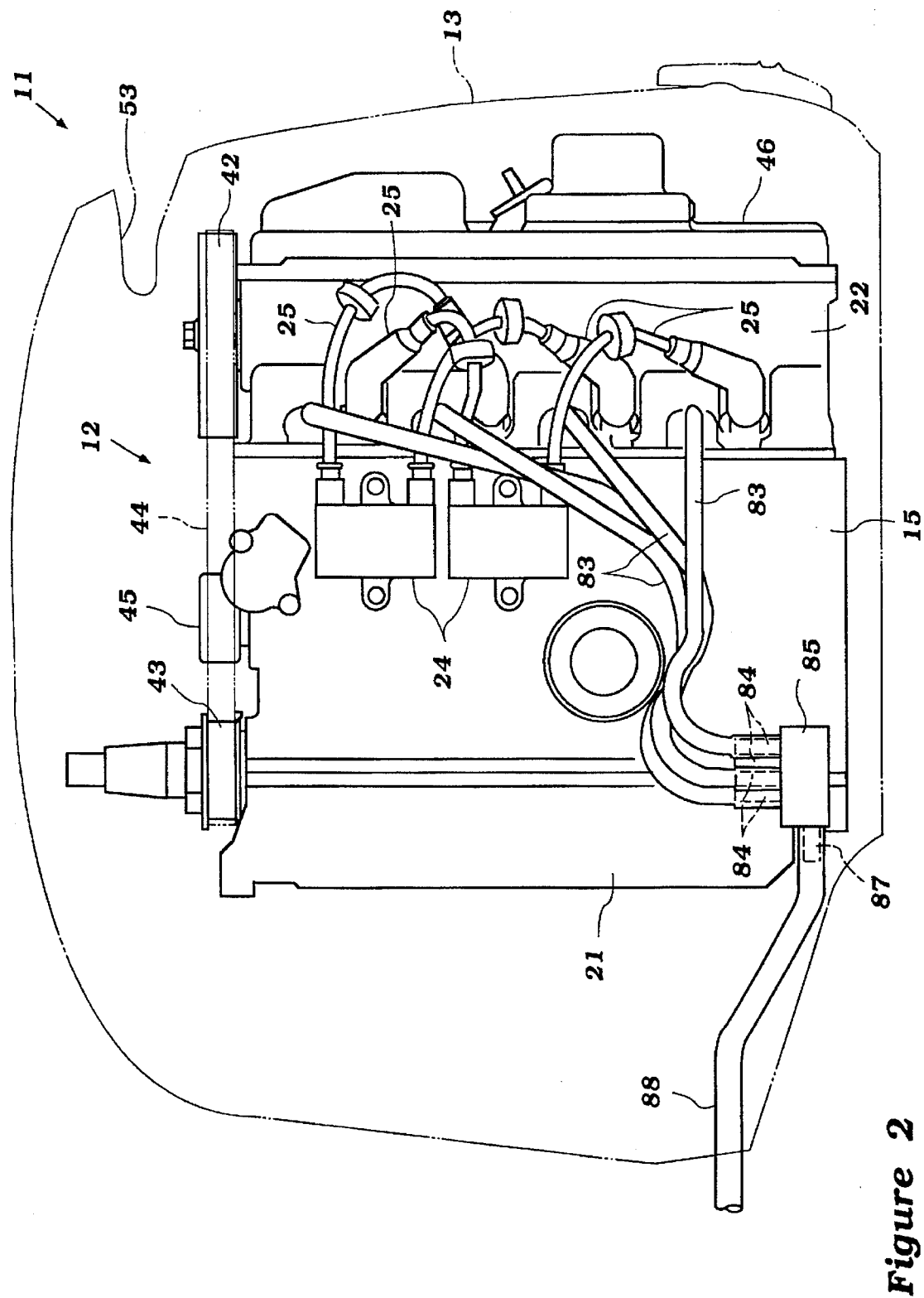
FIG. 2 is a side elevational view of the upper portion of the outboard motor of FIG. 1, with the protective cowling shown in phantom.

Referring now in detail to the drawings, an outboard motor is identified generally by the reference numeral 11. The outboard motor includes a powering internal combustion engine 12 which in the illustrated embodiment is of the four-stroke, four-cylinder, in-line type configuration. It will be readily apparent to those skilled in the art how the invention can be employed in conjunction with other configurations and that certain facets of the invention may be utilized with two-cycle engines or engines having other numbers of cylinders or other cylinder configurations.

The engine 12 is mounted to an exhaust guide plate (not shown) and forms a portion of the power head of the outboard motor. This power head is completed by a protective main cowling member 13 which surrounds the engine 12 in a known manner and connects its lower end to a tray 14 to whose lower surface the guide plate is connected. As may be seen in FIGS. 1 and 3, the engine 12 is composed of a cylinder block 15 in which four aligned cylinder bores 17 are formed. Pistons 18 reciprocate in the cylinder bores 17 and are connected by means of a piston pins to the small ends of connecting rods 19. The big end of each of the connecting rods 19 are journaled on the throws of a crankshaft 20, which is rotatably journaled within a crankcase member 21. The crankcase member 21 is affixed to a lower surface of the cylinder block 15 in any known manner.

Figure 5:
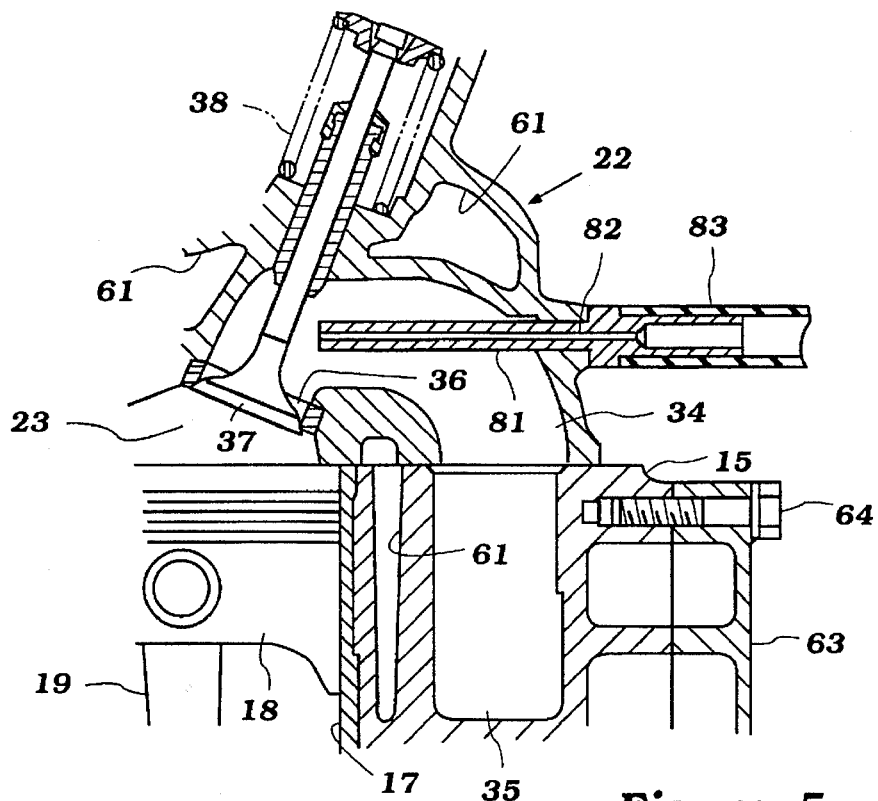
FIG. 5 shows a partial cross-sectional view of the upper portion of the engine that illustrates an embodiment of the invention with a sampling tube in place.
Figure 6:
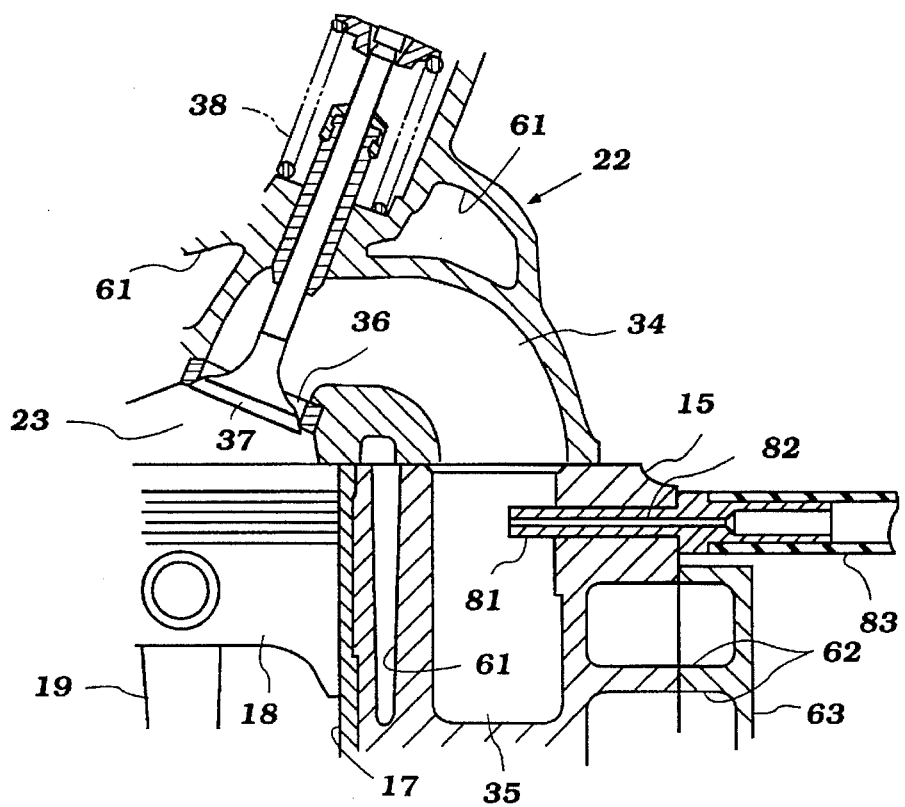
FIG. 6 shows a partial cross-sectional view of the upper portion of the engine, similar to FIG. 5, and illustrates a further embodiment of the invention.

As best seen in FIGS. 1, 5, and 6, a cylinder head assembly, indicated generally by the reference numeral 22, is affixed to the upper surface of the engine block 15 in any well-known manner. The cylinder head 22 has recesses 23 formed in its lower surface above which are positioned spark plugs (not shown) that are activated by ignition coils 24 under the control of an ignition circuit through connectors 25.

The recesses 23 align with the cylinder bores 17 and the heads of the pistons 18 to form the individual combustion chambers of the engine 11. The recesses 23 can be referred to as combustion chambers, since at top dead center (TDC), their volume comprises the major portion of the clearance volume.

Intake passages 31 extend to the combustion chamber 23 from a lower surface which faces toward but is spaced outwardly of the cylinder block 15. These passages extend through the one side of the cylinder head 22 as indicated at 32. Each intake passage 31 terminate at its inner end at a valve seat which is controlled by an intake valve 33.

In a similar manner, exhaust passages 34, serve an exhaust manifold 35 that is formed in major part inside the engine block 15. The exhaust passages extend through the opposite side of the cylinder head 22 from valve seats 36 which are controlled by exhaust valves 37.

The intake and exhaust valves 33 and 37, respectively, are operated on by respective valve springs 38 and cam lobes 39 through respective rocker arms (not shown). The cam lobes 39 form a portion of an overhead camshaft 41 that is journaled for rotation in the cylinder head 22 in a known manner.

Affixed to one end of the camshaft 41 is a sprocket 42 which is driven at one-half engine speed by a crankshaft sprocket 43 affixed to the crankshaft 20 and in communication with the camshaft sprocket 42 via a cam belt 44 that is maintained at an adequate tension by a tension pulley 45. The cylinder head 22 is fully enclosed by a cover 46 mounted above the rocker arms.

Figure 3:
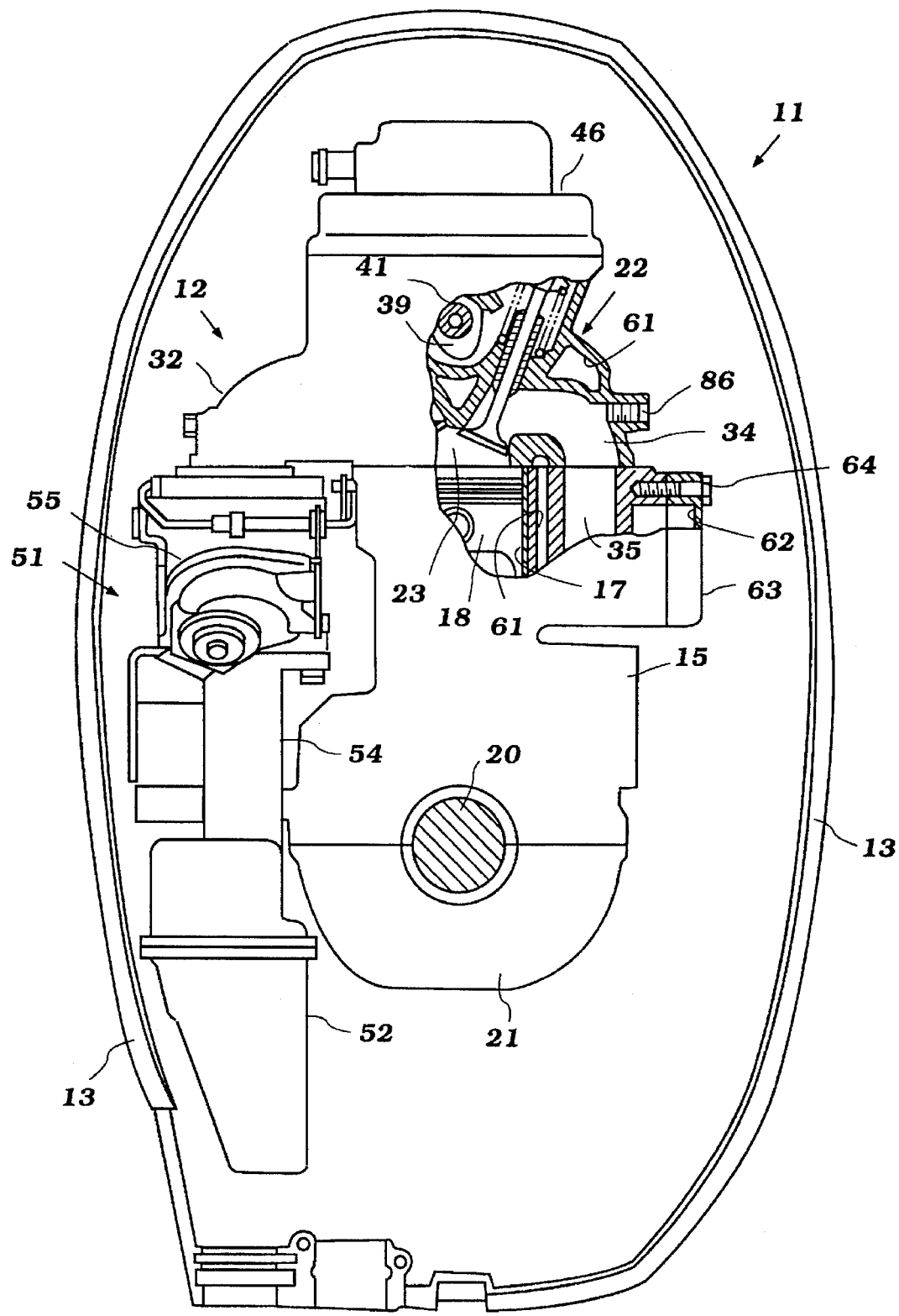
FIG. 3 is a top plan view of the outboard motor that is similar to FIG. 1 but in which the exhaust sampler removed.
Figure 4:
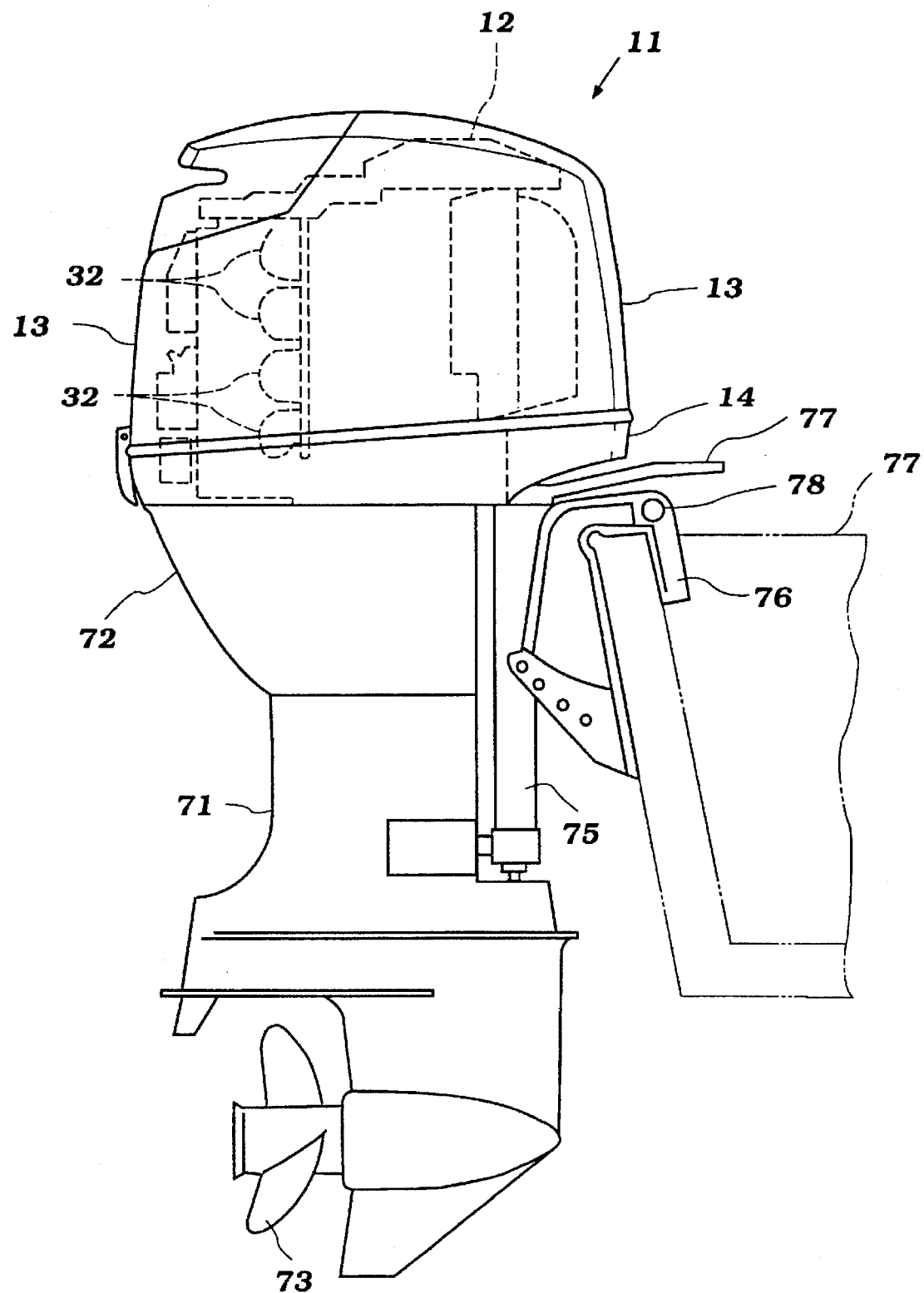
FIG. 4 is a side elevational view of the outboard motor mounted to a watercraft, with the internal combustion engine shown in phantom.

As best seen in FIGS. 1 and 3, an induction and charge-forming assembly serves the intake passages 31. The induction and charge-forming assembly 51 is comprised of an air inlet device 52 which receives a supply of atmospheric air from an inlet 53 disposed at the upper front portion of the main cowling member 13. Air pipes 54 sealingly engage the air inlet device 52 and form branches that each serve separate carburetor assemblies 55 at their upper ends. The carburetors 55, in which are positioned throttle valves (not shown) receive a supply of fuel from a remote fuel tank (not shown). At their discharge ends, each carburetor 55 is connected to the inlet ends of a respective intake passage 31.

As is typical with outboard motor practice, the cylinder block 15 and cylinder head 22 are formed with cooling jackets 61 that supply coolant to the engine 12 which serves to cool the engine block 15 and the cylinder head 22. Additional cooling jackets 62 are formed along the outside portion of the engine block 15 around the exhaust manifold 35 by a plate 63 in which recesses are formed, which is bolted to the block 15 by bolts 64 and defines an internal jacket that cools the exhaust gases in the exhaust manifold 35.

The coolant is circulated from the body of water in which the outboard motor 11 is operating through an inlet (not shown) in a lower housing unit 71 and pumped by a pump (not shown) upwards through a conduit (not shown) and into the engine water jackets 61 and 62. After circulating through the jackets 61 and 62, the water drains into the exhaust system at a location downstream of the exhaust manifold 35.

A drive shaft housing 72 depends from the tray 14 and rotatably journals a drive shaft (not shown) that is driven by the engine crankshaft 20 in a known manner. The drive shaft housing 72 is formed with an internal expansion chamber (not shown) to which exhaust gases are delivered from the manifold 35 through a hole in the guide plate by an exhaust pipe (not shown) and into which the coolant drains and serves to baffle and cool the exhaust gases before they are discharged through a conventional underwater, high-speed exhaust gas discharge, which may comprise an outlet formed in the lower unit 71 or in the hub of a propeller 73 driven by the drive shaft. In addition, an above the water low speed gas discharge (not shown) may also be incorporated.

As is typical of outboard motor practice, a steering shaft 74 is connected to the drive shaft housing 72 in a known manner. This steering shaft is journaled for steering movement about a generally vertically steering axis within a swivel bracket 75. The swivel bracket 75 is in turn pivotally connected to a clamping bracket 76 which is affixed, to the rear of a water craft 77 for tilt and trim movement about a horizontally disposed axis by pivot pin 78.

FIG. 1 shows the outboard motor in a fully trimmed down position. The trim may be adjusted in any known manner. Also, the pivotal connection 78 permits the outboard motor 11 to be titled up out of the water when not in use.

It is often desirable to take a sample of the exhaust gases from one or more of the engine cylinders either continuously or periodically during engine operation. In accordance with this invention the exhaust sample is taken at a point in the exhaust system that is upstream of the location at which the engine coolant enters the exhaust system and also disposes the sampling components away from the cooling jackets. In this manner the sample will not be mixed with any cooling system water or be cooled by the water jackets, but will be indicative of the actual condition of the exhaust gases.

Referring now to FIGS. 1 and 5, a sampling tube 81 extends into the exhaust passage 34 through a sampling port 82 in the cylinder head 22 that threadingly engages the sampling tube 81. A conduit 83 sealingly engages the outer end of the sampling tube 81 at its upper end. At its lower end the conduit 83 sealingly engages a nozzle portion 84 of a collector 85 in which are disposed additional nozzles 84 for receiving exhaust samples from additional engine cylinders, if desired. For those cylinders from which exhaust samples are not desired or at times when sampling is not required, a screw 86 is inserted into and threadingly engages the sampling port 82, and thus seals the exhaust passage 35, as is seen in FIG. 3.

An additional nozzle 87 is positioned on the lower surface of the collector 85 and sealingly engages the upper end of a conduit 88, which exits the outboard motor assembly 11 and connects at its lower end to a sampler, which is not shown.

During an exhaust stroke of the engine 12, a portion of the exhaust gases enters the sample tube 81 and routes through the conduit 83 to the collector 85 and into the sampler via the conduit 88. Since the inlet end of the sampling tube faces the direction of exhaust gas flow, a good sample of instantaneous conditions will be drawn.

While for the above-described exhaust gas sampling system the sampling tube 81 enters the exhaust system through a sampling port 82 in the exhaust passage 35, a further embodiment of the invention illustrated in FIG. 6 shows that the sample tube 81 may also enter the exhaust system through a sample port 82 that is drilled through the outside wall of the exhaust manifold 35. This port is spaced from the water jacket 62.

Thus, it is readily apparent that for both of the above sampler configurations, the exhaust gas sample has in no way been contaminated by the engine's cooling water and is also routed to the sampler via a means entirely separate from the water jackets, which guarantees that none of the exhaust gas constituents will condense out from the exhaust gases.

It should be readily apparent from the foregoing description that the desired embodiments are very effective in meeting the objects as set forth. Of course, various changes and modifications may be made without departing from the spirit and scope of the invention, as defined by the appended claims.

What is claimed is:

1. An marine propulsion internal combustion engine having at least one combustion chamber, a cooling jacket encircling a portion of said engine for cooling said engine, means for circulating coolant from the body of water in which the associated watercraft is operating through said cooling jacket, an exhaust passage formed at least in part in said engine body for discharging exhaust gases from said combustion chamber to the atmosphere, a sampling port extending through said engine body and terminating in said exhaust passage, and closure means for selectively closing said sampling port.

2. A marine propulsion internal combustion engine as set forth in claim 1, wherein the sampling port enters into the exhaust passage in a place upstream of where the cooling water is delivered to the exhaust passage.

3. A marine propulsion internal combustion engine as set forth in claim 1, wherein the sampling port extends through a portion of the engine body wherein there is no cooling jacket.

4. A marine propulsion internal combustion engine as set forth in claim 3, wherein the sampling port enters into the exhaust passage in a place upstream of where the cooling water is delivered to the exhaust passage.

5. A marine propulsion internal combustion engine as set forth in claim 1, wherein the engine is a four cycle engine having a cylinder head and a cylinder block in which the exhaust passage is formed at least in part.

6. A marine propulsion internal combustion engine as set forth in claim 5, wherein the sampling port is formed in the cylinder head.

7. A marine propulsion internal combustion engine as set forth in claim 6, wherein the sampling port enters into the exhaust passage in a place upstream of where the cooling water is delivered to the exhaust passage.

8. A marine propulsion internal combustion engine as set forth in claim 6, wherein the sampling port extends through a portion of the engine body wherein there is no cooling jacket.

9. A marine propulsion internal combustion engine as set forth in claim 8, wherein the sampling port enters into the exhaust passage in a place upstream of where the cooling water is delivered to the exhaust passage.

10. A marine propulsion internal combustion engine as set forth in claim 5, wherein the exhaust passage includes an exhaust manifold formed in the cylinder block and the sampling port is formed in said exhaust manifold.

11. A marine propulsion internal combustion engine as set forth in claim 10, wherein the sampling port enters into the exhaust passage in a place upstream of where the cooling water is delivered to the exhaust passage.

12. A marine propulsion internal combustion engine as set forth in claim 10, wherein the sampling port extends through a portion of the engine body wherein there is no cooling jacket.

13. A marine propulsion internal combustion engine as set forth in claim 12, wherein the sampling port enters into the exhaust passage in a place upstream of where the cooling water is delivered to the exhaust passage.

* * * * *